(12) United States Patent
Sakamoto et al.

(10) Patent No.: US 7,158,035 B2
(45) Date of Patent: Jan. 2, 2007

(54) SERVER APPARATUS AND INFORMATION PROVIDING METHOD

(75) Inventors: Kenji Sakamoto, Chiyoda-ku (JP);
Goro Kunito, Chiyoda-ku (JP);
Kenichi Yamazaki, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 210 days.

(21) Appl. No.: 10/932,121

(22) Filed: Sep. 2, 2004

(65) Prior Publication Data

US 2005/0086108 A1 Apr. 21, 2005

(30) Foreign Application Priority Data

Sep. 5, 2003 (JP) ............ P2003-314451

(51) Int. Cl.
*G08B 13/14* (2006.01)
(52) U.S. Cl. ............... 340/572.4; 340/572.1; 235/375
(58) Field of Classification Search ....... 340/572.4, 340/572.1, 568.5, 5.9, 5.91; 235/375, 383, 235/385; 705/14
See application file for complete search history.

(56) References Cited

U.S. PATENT DOCUMENTS

| | | | |
|---|---|---|---|
| 5,821,513 A * | 10/1998 | O'Hagan et al. | 235/383 |
| 5,880,449 A * | 3/1999 | Teicher et al. | 235/383 |
| 6,084,528 A | 7/2000 | Beach et al. | |
| 7,044,369 B1 * | 5/2006 | Gantz | 235/381 |
| 2002/0139848 A1 | 10/2002 | Catan | |
| 2002/0170961 A1 * | 11/2002 | Dickson et al. | 235/383 |
| 2002/0186133 A1 | 12/2002 | Loof | |
| 2005/0093698 A1 * | 5/2005 | Sakamoto et al. | 340/572.1 |

FOREIGN PATENT DOCUMENTS

| | | |
|---|---|---|
| JP | 2001-22834 | 1/2001 |
| JP | 2001-52054 | 2/2001 |

* cited by examiner

*Primary Examiner*—Toan N. Pham
(74) *Attorney, Agent, or Firm*—Oblon, Spivak, McClelland, Maier & Neustadt, P.C.

(57) ABSTRACT

When an information providing server 20 according to the present invention acquires attribute information items of RFID tags 51 to 59 detected in a shopping cart and in the vicinity thereof, it transmits these attribute information items to a rule server 30. When the received attribute information items satisfy a predetermined combination, the rule server 30 returns presentation information corresponding to the combination to the information providing server 20. When the information providing server 20 receives this presentation information, it sends the presentation information to a mail address of mobile equipment 70 acquired from the attribute information items. This permits the user to readily figure out a dish that can be made from cooking ingredients put in the cart.

6 Claims, 15 Drawing Sheets

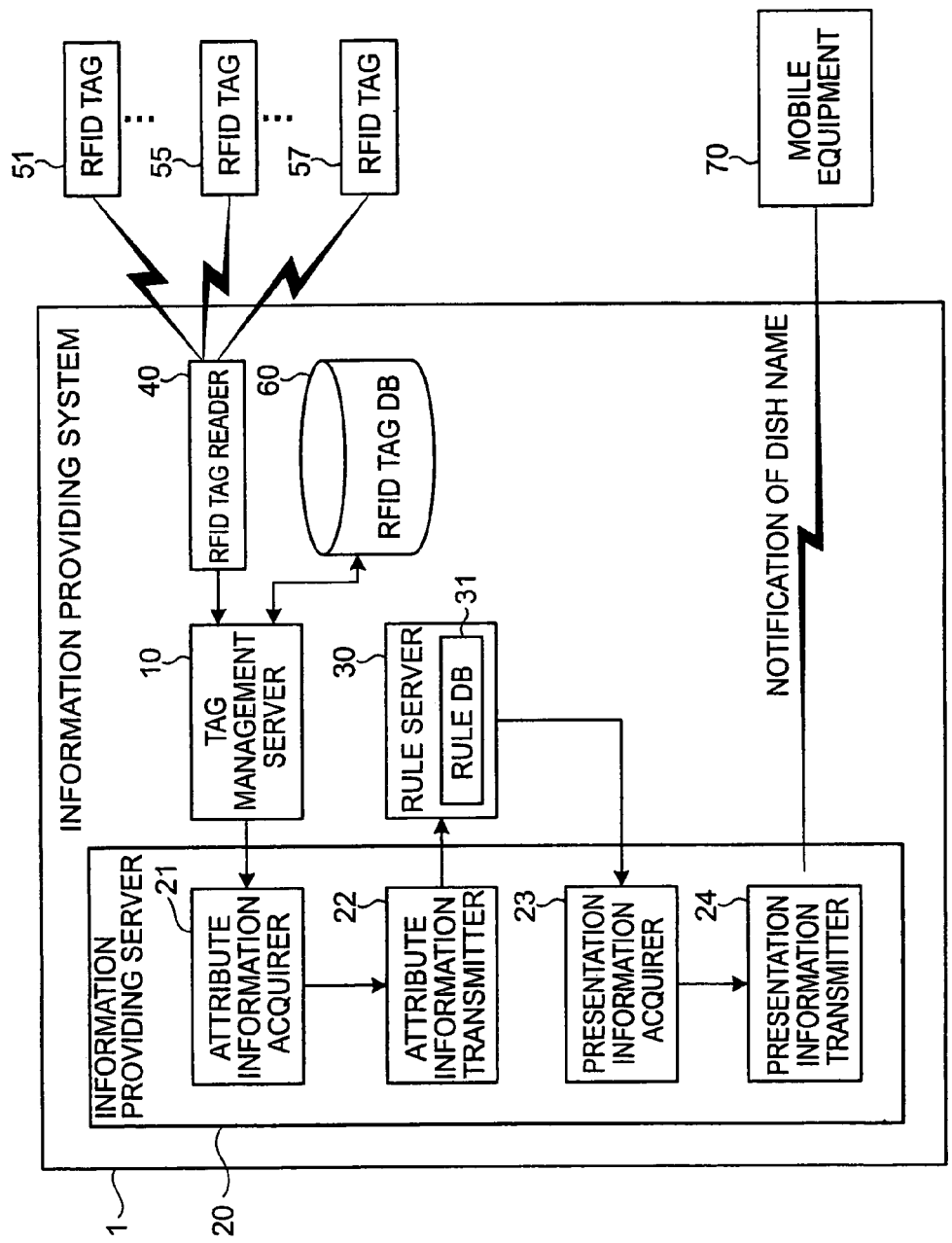

Fig.2

| RFID TAG ID | ATTRIBUTE INFORMATION |
|---|---|
| 51 | MAN, OO OKO, FEMALE, LOVER OF FRENCH CUISINE |
| 52 | TOMATO, PRODUCED IN NAGANO PREFECTURE, HARVESTED JUNE 3, SIZE L |
| 53 | PUMPKIN, PRODUCED IN IBARAKI PREFECTURE, HARVESTED MAY 30 |
| 54 | PARSLEY, PRODUCED IN KAGAWA PREFECTURE, HARVESTED JUNE 2, GROWN IN GREENHOUSE |
| 55 | MILK, PRODUCED IN HOKKAIDO, PRODUCED IN JUNE 9, USE-BY DATE: JUNE 20 |
| 56 | CELL PHONE, OWNER: OO OKO, mail to:aaa@bbb |
| 57 | BREAD, PRODUCED BY △△ BREAD Co., USE-BY DATE: JUNE 30 |
| 58 | MILK, PRODUCED IN HOKKAIDO, PRODUCED JUNE 5, USE-BY DATE: JUNE 17 |
| 59 | MILK, PRODUCED IN HOKKAIDO, PRODUCED JUNE 4, USE-BY DATE: JUNE 16 |

Fig. 3

| Combination of attribution information items | Presentation information |
|---|---|
| Tomato & pasta & ketchup & lover of Italian cuisine | Spaghetti Napolitana |
| Milk & pumpkin & parsley & tomato & bread & female | Pumpkin soup |

*Fig.7*

| COMBINATION OF ATTRIBUTION INFORMATION ITEMS | PRESENTATION INFORMATION |
|---|---|
| THREE OR MORE CARTONS OF MILK | OVERBUYING OF MILK |

| RFID TAG ID | ATTRIBUTE INFORMATION |
|---|---|
| 101 | SHIRT: Made in USA, PRODUCED JUNE 2003, GREEN, LONG-SLEEVED, GuOcci |
| 102 | MAN, OO OKO, FEMALE, 20'S, LOVER OF GuOcci |
| 103 | SCARF: Made in Taiwan, PRODUCED 2002, ORANGE, 2 m |
| 104 | TURBAN: Made in China, PRODUCED 2002, WHITE |
| 105 | MIRROR: Made in Japan, PRODUCED 1998, 1 m × 50 cm, IP ADDRESS: 192.168.0.1 |

| RFID TAG READER ID | ATTRIBUTE INFORMATION |
|---|---|
| 40 | FITTING ROOM, DETECTION RANGE: 2 m |

Fig.13

| COMBINATION OF ATTRIBUTION INFORMATION ITEMS | PRESENTATION INFORMATION | PRESENTATION METHOD |
|---|---|---|
| GREEN SHIRT & 20'S & FEMALE & ORANGE SCARF & WHITE TURBAN | THEY SUIT YOU | HOLOGRAPH |

31e — Combination of Attribution Information Items
31f — Presentation Information
31g — Presentation Method
31 — Table

SERVER APPARATUS AND INFORMATION PROVIDING METHOD

BACKGROUND OF THE INVENTION

1. Field of the Invention

The present invention relates to a server apparatus and an information providing method.

2. Related Background Art

An article management system proposed heretofore is configured to estimate circumstances of a user or articles from a plurality of RFID (Radio Frequency Identification) tags simultaneously detected by an RFID tag reader and to execute a transaction according thereto. For example, Patent Document 1 proposes the following method: when an RFID tag reader set at a bookshelf simultaneously detects an RFID tag attached to a user and an RFID tag attached to a book taken out, it is determined that the user intends to borrow the book, and the book is registered as checked out. Furthermore, Patent Document 2 discloses a system in which a method of the same kind as above is applied to management of taking-out of bottles of chemicals placed on shelves.

[Patent Document 1] Japanese Patent Application Laid-Open No. 2001-22834

[Patent Document 2] Japanese Patent Application Laid-Open No. 2001-52054

SUMMARY OF THE INVENTION

However, the above conventional technologies both concern people and articles to which RFID tags are attached, as objects of identification, but fail to assume presentation of information to users. Therefore, it was infeasible to present beneficial information according to circumstances to users, by making use of individual information related to a plurality of RFID tags, to appropriately modify information to be presented to the users.

An object of the present invention is, therefore, to present beneficial information to users in accordance with attribute information corresponding to a plurality of RFID tags detected by an RFID tag reader.

In order to achieve the above object, a server apparatus according to the present invention comprises: attribute information acquiring means for acquiring attribute information items of a plurality of RFID tags detected by an RFID tag reader; presentation information acquiring means for acquiring presentation information determined according to a combination of the attribute information items acquired by the attribute information acquiring means; and transmitting means for transmitting the presentation information acquired by the presentation information acquiring means.

An information providing method according to the present invention is an information providing method comprising the following steps executed by a server apparatus: an attribute information acquiring step of acquiring attribute information items of a plurality of RFID tags detected by an RFID tag reader; a presentation information acquiring step of acquiring presentation information determined according to a combination of the attribute information items acquired in the attribute information acquiring step; and a transmission step of transmitting the presentation information acquired in the presentation information acquiring step.

According to these aspects of the invention, attribute information items of RFID tags detected by the RFID tag reader are acquired, and thereafter presentation information determined according to the combination of these attribute information items is acquired and transmitted. Namely, since RFID tags of articles selected by a user are detected by an RFID tag reader located in the vicinity of the user, the attribute information items of these RFID tags are highly likely to be those reflecting circumstances or preference of the user. Such likelihood is further enhanced by multiplicity of the attribute information acquired. Accordingly, when the server apparatus acquires information derived from the combination of these attribute information items and transmits the information to the user, it becomes feasible to present beneficial information to the user.

The plurality of RFID tags may be RFID tags detected by a plurality of different RFID tag readers. In other words, a plurality of RFID tags as objects of acquisition of attribute information do not always have to be those detected by a single RFID tag reader. This permits the server apparatus to present to the user, information of a combination of attributes of articles located at remote places apart from each other, e.g., indoors and outdoors, at a supermarket and in a refrigerator, and so on. Since the server apparatus can also select an RFID tag reader for detection of RFID tags in view of the attribute of the user so as to acquire attribute information items of articles properly reflecting user-specific circumstances or preference, it becomes feasible to present more beneficial information.

The presentation information can be information of an object substantialized by a combination of objects related to the attribute information items. For examples in a case where the attribute information items are related to pumpkin, parsley, and milk, a dish such as pumpkin soup that can be made from these ingredients can be presented as presentation information to the user. In this case, the user can readily and promptly figure out the dish that can be made from ingredients put for purchase in a basket or ingredients previously put in a refrigerator, without need for an extra operation.

The presentation information may be information indicating that a number of objects related to the attribute information items exceeds a predetermined number. Namely, when the number of articles some or all of which have the same attribute information exceeds the predetermined number, the server apparatus notifies the user of the fact through the presentation information. For example, where a plurality of RFID tags containing parsley as attribute information are detected, the server apparatus counts the number of parsley. When the count result exceeds a predetermined threshold, a message of overbuying of parsley is presented to the user. This prevents the user from overbuying ingredients.

The presentation information may be information of an object as a shortage in producing a predetermined object by combining objects related to the attribute information items. For example, suppose that pumpkin soup can be made from ingredients of pumpkin, parsley, and milk. In this case, in conjunction with detection of RFID tags containing attribute information items of pumpkin and milk, parsley as a missing ingredient is presented as presentation information to the user. Therefore, the user can readily know the remaining ingredient to be additionally purchased in order to make the desired dish, without need for an extra operation.

The present invention enables presentation of beneficial information to the user, according to attribute information items corresponding to a plurality of RFID tags detected by an RFID tag reader.

BRIEF DESCRIPTION OF THE DRAWINGS

FIG. 1 is an illustration showing a functional configuration of an information providing system in the first embodiment of the present invention.

FIG. 2 is a diagram showing an example of correspondence between RFID tag IDs and attribute information items stored in an RFID tag DB.

FIG. 3 is a diagram showing a dish presentation rule set in a rule server in the first embodiment.

FIG. 7 is a diagram showing an overbuying notification rule set in a rule server in the second embodiment.

FIG. 12 is a diagram showing an example of correspondence between an RFID tag reader ID and attribute information stored in a reader DB.

FIG. 13 is a diagram showing a fashion check rule set in a rule server in the third embodiment.

DESCRIPTION OF THE PREFERRED EMBODIMENTS

First Embodiment

Figure 4:
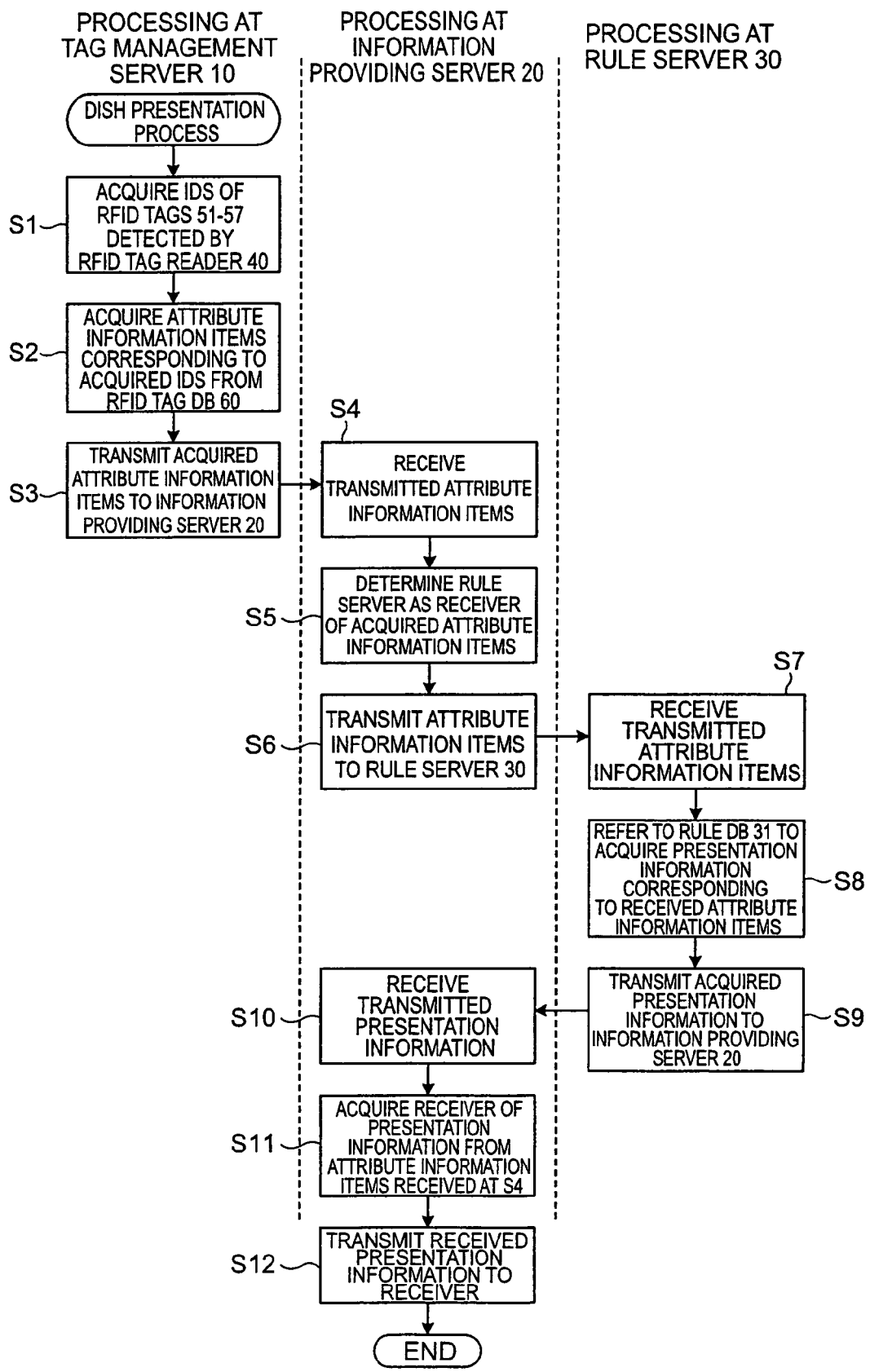
FIG. 4 is a flowchart for illustrating a dish presentation process.

An information providing system in the first embodiment of the present invention will be described below with reference to the accompanying drawings. FIG. 1 is an illustration showing a configuration of information providing system 1 in the present embodiment. As shown in FIG. 1, the information providing system 1 is comprised of a tag management server 10, an information providing server 20 (corresponding to the server apparatus), a rule server 30, an RFID tag reader 40, and an RFID tag DB (DataBase) 60.

The tag management server 10 is connected to the RFID tag reader 40 installed in a shopping cart. Based on IDs of RFID tags (51, . . . , 55, . . . , 57) detected by the RFID tag reader 40, the tag management server 10 acquires attribute information items corresponding to these IDs from the RFID tag DB 60. The attribute information items thus acquired are transmitted together to the information providing server 20. Attribute information items are preliminarily stored in correspondence with IDs of RFID tags in the RFID tag DB 60.

FIG. 2 shows a data storage example in the RFID tag DB 60. For example, the ID "51" of the RFID tag attached to a user of mobile equipment 70 is related to such data as "man, oo oko, female, lover of French cuisine," as attribute information. In addition, the IDs "52, 53, 54, 55, and 57" of the RFID tags attached to ingredients are related to such data as a class, a production area, a harvest date (or production date), a size, and a use-by date as attribute information. Furthermore, the ID "56" of the RFID tag attached to the mobile equipment 70 is related to such data as a cell phone, an owner name, and a mail address.

The information providing server 20 is functionally comprised of an attribute information acquirer 21 (corresponding to the attribute information acquiring means), an attribute information transmitter 22, a presentation information acquirer 23 (corresponding to the presentation information acquiring means), and a presentation information transmitter 24 (corresponding to the transmitting means).

The attribute information acquirer 21 receives the attribute information items transmitted from the tag management server 10, in a lump. Since the attribute information items contain the attribute information about the user, as described above, it is thus identifiable that the attribute information items simultaneously received are those related to the user. In the present embodiment, the attribute information items shown in FIG. 2 are received in a lump. This permits the information providing server 20 to acknowledge that the user identified by the RFID tag ID "51" is going to buy a tomato, a pumpkin, a bunch of parsley, a loaf of bread, and a carton of milk. It is also identifiable that the mail address "aaa@bbb" of the cell phone can be used as a destination of presentation information.

The attribute information transmitter 22 transmits the attribute information items acquired by the attribute information acquirer 21, to the rule server 30.

The presentation information acquirer 23 receives and acquires presentation information transmitted from the rule server 30.

The presentation information transmitter 24 transmits the presentation information acquired by the presentation information acquirer 23, to the mail address of the mobile equipment 70 included in the attribute information items.

When the rule server 30 receives the plurality of attribute information items from the attribute information transmitter 22 of the information providing server 20, it determines the presentation information by combining them, and transmits it to the information providing server 20. The presentation information is determined with reference to a rule DB 31 shown in FIG. 3. FIG. 3 is a diagram showing a data storage example in the rule DB 31. The rule DB 31 has a combination area 31a storing combinations of attribute information items, and a presentation information area 31b storing information items to be presented according to the combinations of attribute information items.

How to prepare the presentation information items will be more specifically described with reference to FIG. 3. For example, in a case where the attribute information items acquired contain all of "tomato," "pasta," "ketchup," and "lover of Italian cuisine," it can be determined that "spaghetti Napolitana" can be made from these ingredients and that the user is a lover of Italian cuisine. Therefore, "spaghetti Napolitana" is set as presentation information in the rule server 30.

Furthermore, for example, in a case where the attribute information items acquired contain all of "milk," "pumpkin," "parsley," "tomato," "bread," and "female," it is determined that "pumpkin soup" can be made from these ingredients and that the user is a female. Therefore, "pumpkin soup" is set as presentation information in the rule server 30.

The presentation information may also contain amounts of ingredients and how to make a dish (recipe), in addition to a name of the dish.

The operation of the information providing system 1 in the present embodiment will be described below with reference to FIG. 4, while also explaining each of steps constituting an information providing method according to the present invention. FIG. 4 is a flowchart for explaining a dish presenting-process.

At S1, the tag management server 10 acquires IDs of RFID tags 51–57 detected by the RFID tag reader 40 within a predetermined period of time (e.g., two seconds) which can be deemed as simultaneous. Subsequently, the tag management server 10 refers to the RFID tag DB 60 to acquire attribute information items related to the RFID tag IDs acquired at S1 (S2). The tag management server 10 transmits the attribute information items acquired at S2, to the information providing server 20 (S3). Let us suppose that the seven types of attribute information items transmitted at this time are the attribute information items related to the RFID tag IDs 51 to 57, shown in FIG. 2.

At S4, the information providing server 20 receives the attribute information items transmitted at S3, by the attribute information acquirer 21.

When the attribute information items are fed to the attribute information transmitter 22, the attribute information transmitter 22 determines a rule server as a receiver of the attribute information items (S5).

Where there are a plurality of rule servers as candidates for the receiver of the attribute information items, a rule server as a receiver of the attribute information items has to be selected at S5, and examples of selecting techniques will be presented below. The first technique is a technique of selecting the rule server by use of classes of objects included in the attribute information items received at S4. Namely, when the majority of classes of objects included in the attribute information items are foods such as tomato and bread, the information providing server 20 selects a rule server 30 capable of presenting dishes and recipes. On the other hand, when the majority of classes of objects are clothing such as clothes and hats, the information providing server 20 selects another rule server capable of presenting information about fashion.

The second conceivable technique is a technique of selecting a rule server by use of a location of an RFID tag reader having detected RFID tags. Namely, the information providing server 20 receives an ID of the RFID tag reader having detected the RFID tags, along with the attribute information items at S4, and determines a rule server as a receiver of the attribute information items, based on a place where the RFID tag reader is installed. Here the correspondence between the location of the RFID tag reader and the reader ID may be preliminarily registered by a server administrator, or may be acquired in such a way that the RFID tag reader is provided with a position detecting device such as the GPS (Global Positioning System) and that the correspondence is regularly acquired from the device.

In a scheme of this kind, for example, where the place corresponding to the reader ID received is a supermarket, it is expected that there are many purchasers of foods, and the information providing server 20 selects a rule server 30 capable of presenting dishes and recipes. Where the place corresponding to the reader ID is a fitting room in a department store or the like, information about whether clothes to be purchased suit a user is profitable to the user, and thus the information providing server 20 selects another rule server capable of presenting a result of a fashion check.

Furthermore, it is a matter of course that the first and second techniques can be used in combination.

The present embodiment assumes the first technique. Again referring to FIG. 2, since the majority (five out of seven) of the classes of objects included in the attribute information items of the RFID tag IDs 51–57 are cooking ingredients, the information providing server 20 selects the rule server 30 as a rule server of a receiver. Therefore, the information providing server 20 makes the attribute information transmitter 22 transmit the attribute information items received at S4, to the rule server 30 determined at S5 (S6).

When the rule server 30 receives all the attribute information items transmitted at S6 (S7), it refers to the rule DB 31 shown in FIG. 3, to acquire presentation information corresponding to the received attribute information items (S8). In the present embodiment, the classes of objects included in the attribute information items are seven kinds, "man, tomato, pumpkin, parsley, milk, cell phone, and bread." The attribute information having "man" as a class contains "female." With reference to the combination area 31a of the rule DB 31, a combination of all the classes (milk, pumpkin, parsley, tomato, and bread) is registered in a lower box. It also satisfies a condition of having "female" as attribute information. Therefore, "pumpkin soup" is acquired as the presentation information. When no combination satisfying the attribute information items received at S7 is registered in the rule DB 31, the dish presenting process is terminated.

At S9, the rule server 30 transmits the presentation information acquired at S8, to the information providing server 20.

When the information providing server 20 receives the presentation information by the presentation information acquirer 23 (S10), it again refers to the attribute information items received at S4, in order to specify a destination of this presentation information. With reference to FIG. 2, the attribute information having "cell pone" as a class contains the mail address "aaa@bbb." Therefore, the presentation information acquirer 23 acquires this mail address as a destination of the presentation information (S11).

The information providing server 20 makes the presentation information transmitter 24 transmit the presentation information received at S10, to the destination acquired at S11 (S12). In consequence, an e-mail message containing the description of "pumpkin soup" as the presentation information is delivered to the mobile equipment 70. The user of the mobile equipment 70 reads this e-mail message to learn that pumpkin soup can be made from ingredients put at present in a shopping cart.

As described above, the information providing system 1 in the first embodiment executes the following processing, without receiving any explicit request from the user. First, the RFID tag reader 40 installed in the shopping cart used by the user detects the RFID tags 51–57 attached to the cooking ingredients, the mobile equipment 70, and the user herself. When these RFID tag IDs are sent to the tag management server 10, the tag management server 10 refers to the RFID tag DB 60 to acquire the attribute information items, and sends them to the information providing server 20. The information providing server 20 acquires the presentation information according to the combination of the attribute information items thus notified of, which satisfies the condition, from the rule server 30, and notifies the user of the presentation information via the mobile equipment 70. This permits the user to readily learn a dish that can be made from ingredients, and how to make it, by the simple operation of putting the ingredients of interest in purchase into the shopping cart.

If bar codes are used instead of the RFID tags, the user has to perform at least an operation of bringing a reader over a bar code on an ingredient. The bar codes have physical drawbacks: e.g., they cannot be detected unless their reading surface is seen, it is difficult to detect them with flaw or dust thereon, and so on. However, the configuration wherein an RFID tag reader is installed in a shopping cart and wherein this RFID tag reader receives radio waves emitted from RFID tags, obviates the need for the above operation and eliminates such drawbacks. As a result, it becomes feasible to provide beneficial information to users, without hampering convenience of users.

Second Embodiment

Subsequently, the second embodiment of the present invention will be described with reference to FIGS. 5 to 9. The information providing system 1 in the first embodiment was assumed to use one RFID tag reader. In contrast to it, the second embodiment assumes a scheme in which a plurality of RFID tag readers are used in collaboration with each other to present more beneficial information, in addition to the aforementioned presentation information.

Figure 5:
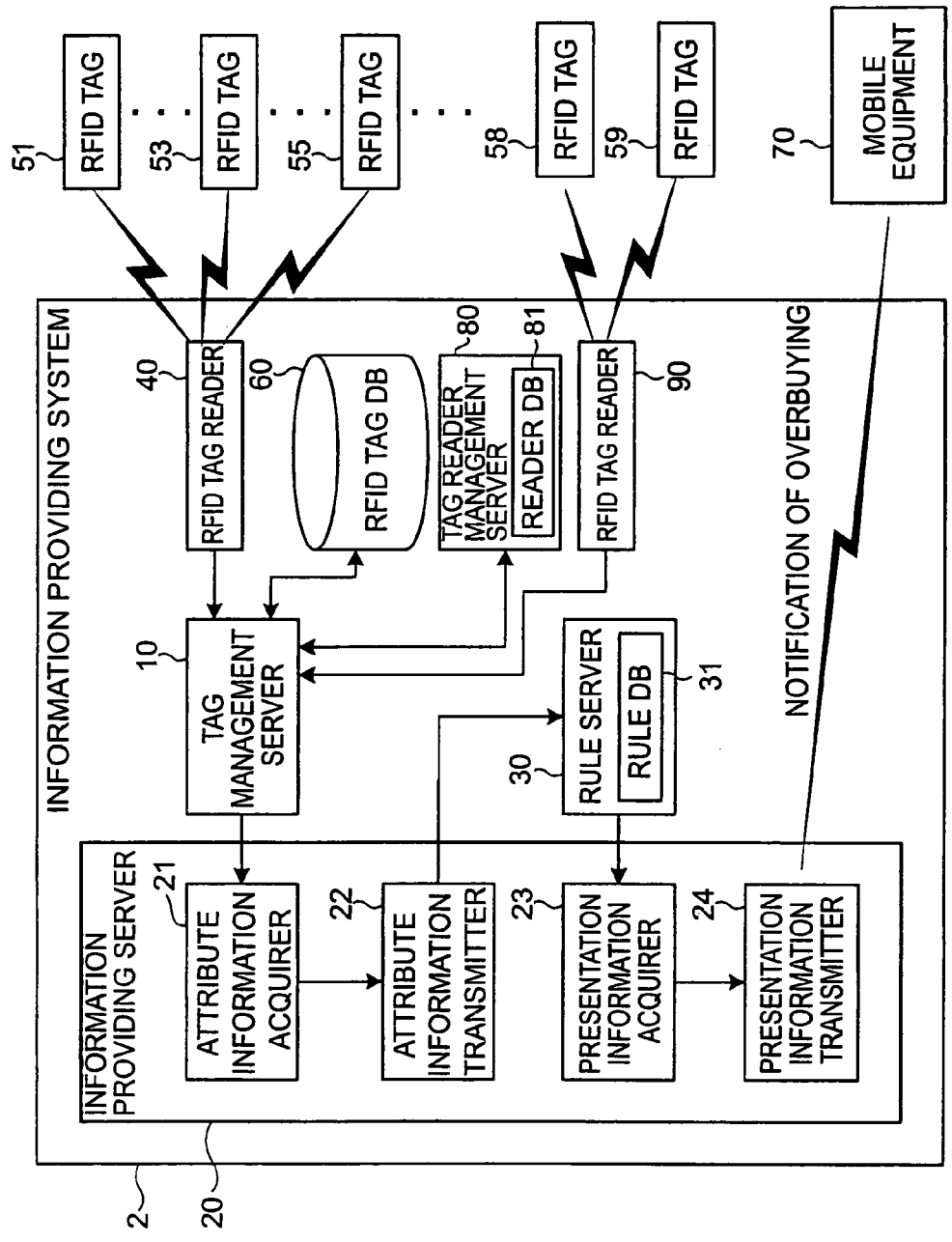
FIG. 5 is an illustration showing a functional configuration of an information providing system in the second embodiment.
Figure 6:
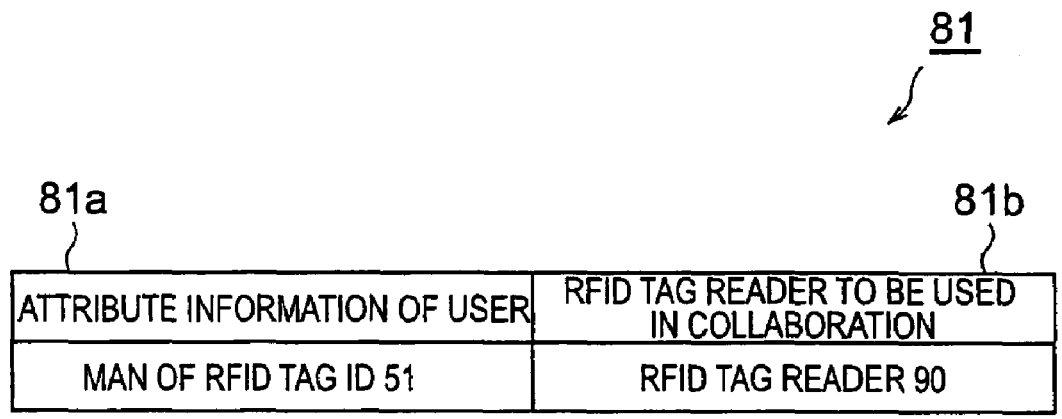
FIG. 6 is a diagram showing an example of correspondence between user attribute information and an RFID tag reader registered in a tag reader management server.

FIG. 5 is a block diagram showing a functional configuration of an information providing system 2 in the second embodiment. Since the major part of the configuration of the information providing system 2 is the same as that of the configuration of the information providing system 1 detailed in the first embodiment, each component is denoted by the same reference symbol, without description thereof, and differences from the first embodiment will be described below.

The information providing system 2 is provided with a tag reader management server 80 and an RFID tag reader 90, as components peculiar to the present embodiment. The tag reader management server 80 has a reader DB 81. The reader DB 81 has a configuration shown in FIG. 6. Namely, the reader DB 81 has an attribute information area 81a storing attribute information of the user, and a reader area 81b storing an ID of an RFID tag reader to be used in collaboration. The attribute information area 81a stores, for example, "51" as an ID of an RFID tag a class of attribute information of which is a man, and in this case, an ID "90" of an RFID tag reader set in a refrigerator at home of that person is related thereto in the reader area 81b. This permits the tag management server 10 to uniquely determine another reader as a destination of a request for RFID tag IDs, by specifying information of a person (user) included in the attribute information. The user is allowed to preliminarily register an ID of an RFID tag reader to be used in collaboration, by use of the mobile equipment 70.

The RFID tag reader 90 is set in a refrigerator at home of the user with the RFID tag 51. RFID tags are attached to all ingredients stored in the refrigerator. In response to a request from the tag management server 10, the RFID tag reader 90 detects these RFID tags and sends IDs "58" and "59" thereof to the tag management server 10. The tag management server 10 refers to the RFID tag DB 60 to acknowledge that classes of objects related to the received IDs both are milk.

FIG. 7 shows a data storage example in the rule DB 31 of the rule server 30 in the present embodiment. In the rule DB 31, as shown in FIG. 7, a combination of attribute information items, and presentation information are stored in correspondence with each other. This enables the following operation: if classes of articles in the acquired attribute information items include three or more cartons of milk, i.e., if the total number of cartons of milk already stored at home and milk about to be purchased is three or more, "overbuying of milk" can be selected as the presentation information.

Figure 8:
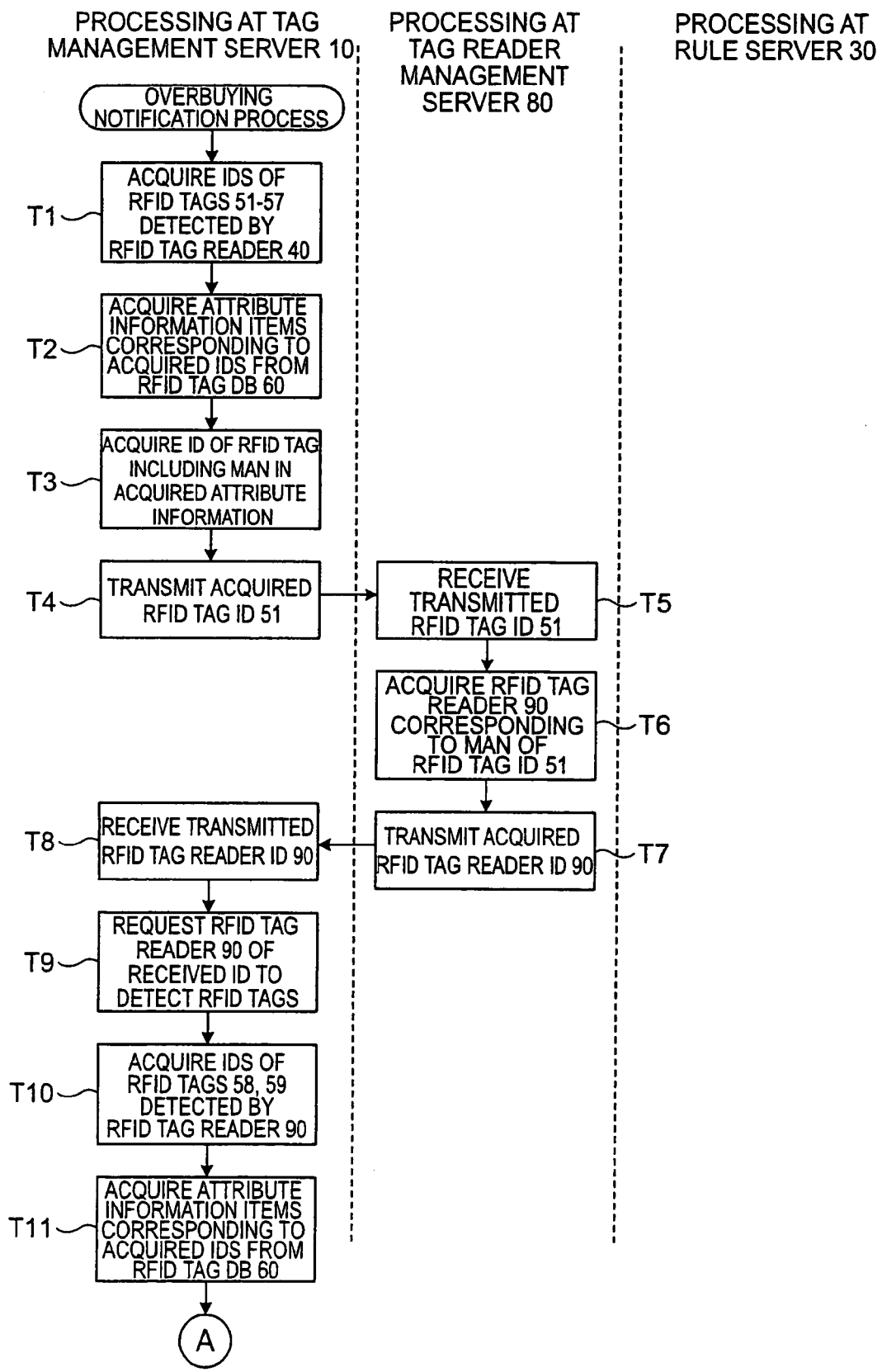
FIG. 8 is a diagram showing the first half of a flowchart for illustrating an overbuying notification process.

Next, an overbuying notification process as an operation in the second embodiment will be described with reference to FIG. 8. In addition, each of steps forming an information providing method according to the present invention will also be described. The present overbuying notification process contains a plurality of steps similar to those in the dish presentation process (cf. FIG. 4) detailed in the first embodiment. Therefore, the description of the common steps is omitted herein, and processes peculiar to the present invention will be described below. Specifically, T1 and T2 in FIG. 8 are equivalent to S1 and S2 shown in FIG. 4, and T12–T21 in FIG. 9 to S3–S12, respectively, in FIG. 4.

First, at T3 the tag management server 10 refers to the attribute information items acquired at T2 to acquire an ID of an RFID tag including "man" as an element thereof. In the present embodiment, it is assumed that at T1 the attribute information items corresponding to IDs 51–57 were acquired out of the attribute information items shown in FIG. 2, and thus the RFID tag ID "51" is acquired at T3. Subsequently, the tag management server 10 refers to the tag reader management server 80 to acquire an ID of an RFID tag reader related to the person having the acquired RFID tag ID, in order to specify an RFID tag reader as a destination of a request for detection of RFID tags (T4).

The tag reader management server 80 receives the RFID tag ID "51" transmitted at T4 (T5). As described above with reference to FIG. 6, the tag reader management server 80 stores the RFID tag reader 90 registered as an RFID tag reader to be used in collaboration with the man having the RFID tag ID "51." Therefore, at T6 the ID "90" of the RFID tag reader 90 is acquired and is transmitted to the tag management server 10 (T7).

When the tag management server 10 receives the RFID tag reader ID transmitted at T7 (T8), it transmits a request for detection of RFID tags, to the RFID tag reader 90 identified by the ID (T9). In response to this detection request, the RFID tag reader 90 detects RFID tags 58, 59 located in a communication area thereof to acquire IDs thereof. The RFID tag IDs thus acquired are transmitted to the tag management server 10. When the tag management server 10 receives the RFID tag IDs "58," "59" (T10), it acquires attribute information items corresponding to these IDs from the RFID tag DB 60 in the same manner as at T2 (T11). With reference to FIG. 2, the IDs "58" and "59" are related each to a class, a product area, a production date, and a use-by date as their attribute information items, and thus these information items are acquired.

Figure 9:
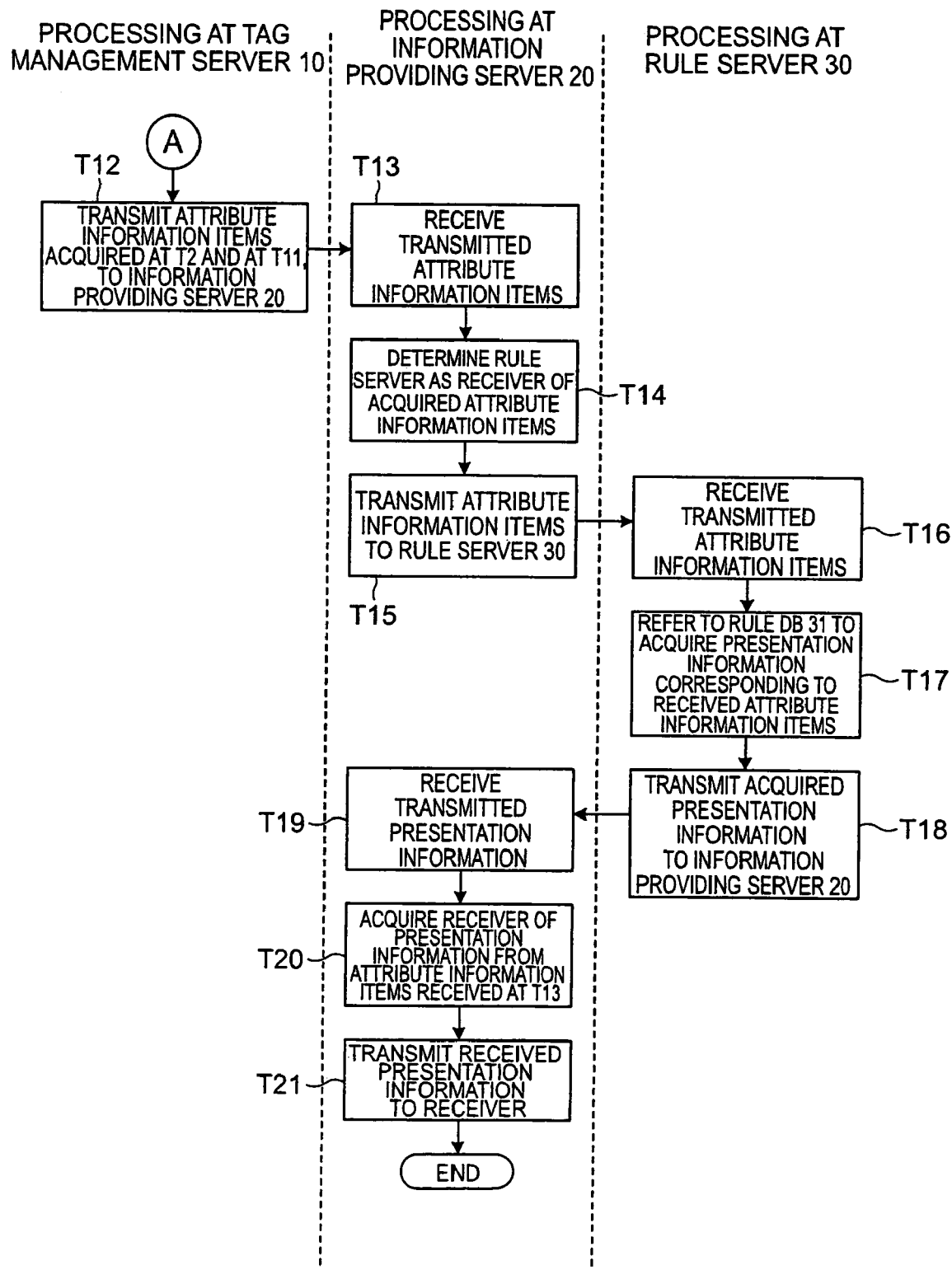
FIG. 9 is a diagram showing the second half of the flowchart for illustrating the overbuying notification process.

Shifting to FIG. 9, at T12 the tag management server 10 sends the attribute information items acquired at T2 and the attribute information items acquired at T11, to the information providing server 20. Here the attribute information items acquired at T2 contain elements about cooking ingredients put in the shopping cart of the user of the mobile equipment 70 and the attribute information items acquired at T11 contain elements about cooking ingredients stored in the refrigerator at home of the user. The information providing server 20 performs processes at and after T13 to transmit the presentation information obtained from the attribute information items corresponding to the RFID tags detected by the two RFID tag readers 40, 90, to the mobile equipment 70. This permits the user to obtain the information reflecting the already purchased ingredients, in addition to the ingredients about to be purchased.

More specifically, set in the present embodiment is a rule of presenting presentation information of "overbuying of milk" if the combination of attribute information items satisfies a condition of "three or more cartons of milk" (cf. FIG. 7). From the attribute information items received at T13 by the information providing server 20, there are a carton of milk put in the shopping cart and two cartons of milk already stored in the refrigerator at home, and it can be determined that there are three cartons of milk in all. For this reason, this determination result satisfies the condition set in the rule server 30, and thus the presentation information is transmitted via the information providing server 20 to the mobile equipment 70. Therefore, when the user of the mobile equipment 70 checks an e-mail message sent to "aaa@bbb," she can readily figure out the overbuying of milk.

It is not to be understood that either one of the first and second embodiments is exclusively applied; on the contrary they can also be applied in combination, of course. Specifically, the second embodiment may also be modified so that the information providing server 20 notifies the user of a dish that can be made from a combination of cooking ingredients placed in the shopping cart and in the refrigerator at home. At this time, if there are surplus ingredients (excessive ingredients) in preparing the dish, the user is also simultaneously notified of the fact. This permits the user to learn the dish that can be made from the ingredients at present and also to purchase the necessary minimum amounts of ingredients for preparing the dish.

The information providing systems 1, 2 in the first and second embodiments can also be implemented in an application form as described below. Namely, S8 in FIG. 4 was to transmit the presentation information to the user only if the attribute information items acquired from the tag management server 10 contain all the attribute information items registered as a combination in the rule DB 31. However, it may be arranged as follows: even if the attribute information items acquired do not contain all the attribute information items registered but contain not less than a predetermined rate thereof, the presentation information is transmitted to the user. However, since the ingredients available at present are not enough to prepare the desired dish, the presentation information transmitted in this case is desirably information containing an ingredient as a shortage for preparing the dish, instead of the dish name.

For example, let us suppose, as shown in FIG. 3, that the rule DB 31 stores the combination of attribute information items of "tomato, pasta, ketchup, lover of Italian cuisine" and "spaghetti Napolitana" is registered as presentation information corresponding thereto. In this case, even though pasta and ketchup only are in the shopping cart of the user, two out of three kinds of ingredients necessary for preparing spaghetti Napolitana are already put in the shopping cart, and it is expected that the user is highly likely to prepare spaghetti Napolitana. Accordingly, the information providing server 20 transmits to the mobile equipment 70, a message of "Tomato is necessary for preparation of spaghetti Napolitana." Therefore, even in such cases where there are not all ingredients for a desired dish, the user can readily and promptly figure out the dish and insufficient ingredients.

This insufficient ingredient notification process can also be applied to the result of addition of ingredients stored in the refrigerator at home, of course. This permits the user to readily know insufficient ingredients even after addition of the existing ingredients to the ingredients about to be purchased. As a result, it is feasible to prevent the user from forgetting to buy necessary ingredients or from overbuying ingredients already purchased.

Third Embodiment

Subsequently, the third embodiment of the present invention will be described with reference to FIGS. 10 to 15. The information providing systems 1, 2 in the first and second embodiments were constructed on the assumption that they were applied to the purchase of cooking ingredients at the supermarket. In contrast to it, an information providing system 3 of the third embodiment is constructed on the assumption that it is applied to a fashion check service in a fitting room. The detailed processing contents will be described later, but the present embodiment enables a person in a fitting room to readily judge whether the person looks good in clothes on sale, without indeed trying them on.

Figure 10:
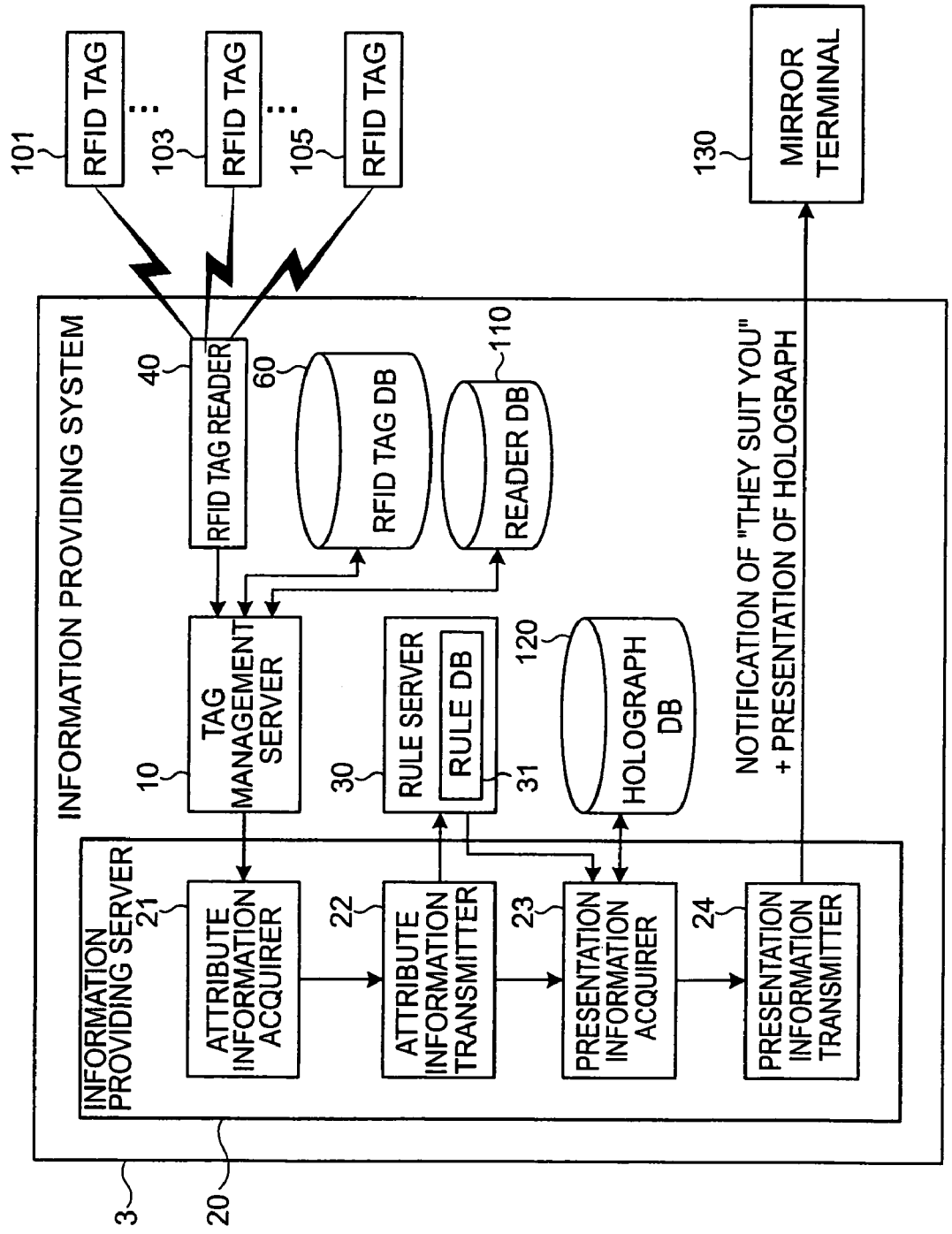
FIG. 10 is an illustration showing a functional configuration of an information providing system in the third embodiment.

FIG. 10 is a block diagram showing a functional configuration of the information providing system 3 in the third embodiment. Since the major part of the configuration of the information providing system 3 is the same as that of the configuration of the information providing system 1 detailed in the first embodiment, each component is denoted by the same reference symbol, without description thereof, and differences from the first embodiment will be described below.

Figure 11:
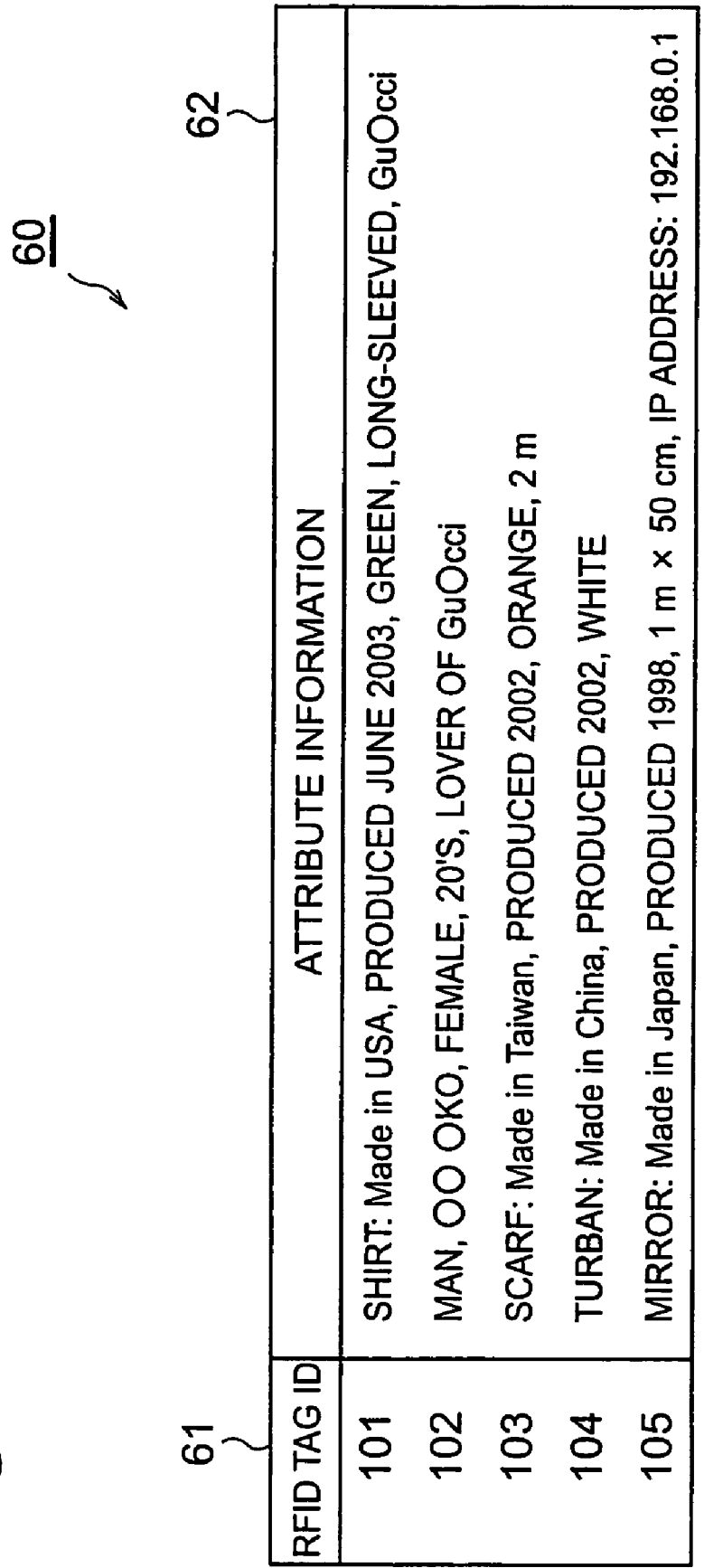
FIG. 11 is a diagram showing an example of correspondence between RFID tag IDs and attribute information items stored in an RFID tag DB in the third embodiment.

First, the information providing system 3 has an RFID tag DB 60, which is different in stored data from that in the first and second embodiments. FIG. 11 shows an example of data stored in the RFID tag DB 60 in the present embodiment. As shown in FIG. 11, the RFID tag DB 60 has an RFID tag ID area 61 and an attribute information area 62. In the RFID tag ID area 61, "101, 102, 103, 104, and 105" are stored as identification information of RFID tags 101 to 105. In the attribute information area 62, attribute information items of a person or articles to which the RFID tags with these IDs are attached are stored corresponding to the RFID tag IDs.

The information providing system 3 is further provided with a reader DB 110 as a component peculiar to the present embodiment. The reader DB 110 has a configuration shown in FIG. 12. Namely, in the reader DB 110, "40" being the identification information of the RFID tag reader 40 is stored corresponding to "fitting room" indicating a place where the RFID tag reader 40 is installed, and geographical coverage "2 m" within which the RFID tag reader 40 can detect an RFID tag. The tag management server 10 connected to the reader DB 110 acquires the attribute information of the RFID tag reader having detected an RFID tag, from the reader DB 110 and transmits it with the attribute information of the RFID tag to the information providing server 20, whereby the information providing server 20 can select a rule server to be used.

FIG. 13 is a diagram showing a data storage example in the rule DB 31 of the rule server 30 in the present embodiment. As shown in FIG. 13, the rule DB 31 stores a combination of attribute information items and presentation information in correspondence with each other. This enables the following operation: if the attribute information items acquired contain "green shirt, 20's, female, orange scarf, white turban," "They suit you" can be selected as presentation information, and a "holograph" as a presentation method.

An interior configuration of holograph DB 120 is not illustrated in particular herein, but the holograph DB 120 stores attribute information of RFID tags, and holographs of people wearing clothes with corresponding RFID tags. When the holograph DB 120 acquires attribute information from the information providing server 20, it provides a holograph corresponding to the attribute information, for the information providing server 20. The holograph may be one selected from existing holographs in the database, or one generated as needed on the basis of the acquired attribute information, as triggered by an event of acquisition of the attribute information.

Figure 14:
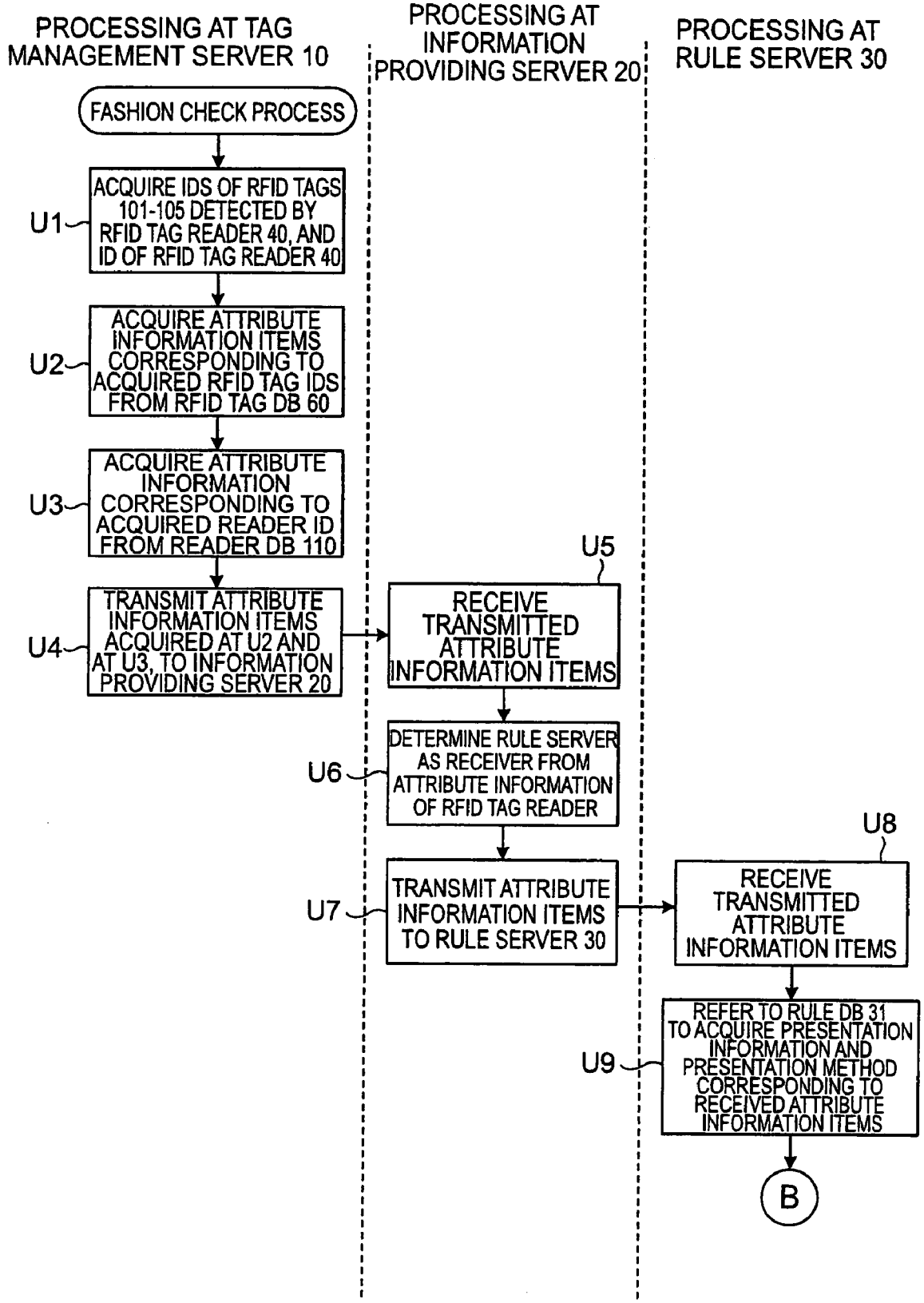
FIG. 14 is a diagram showing the first half of a flowchart for illustrating a fashion check process.
Figure 15:
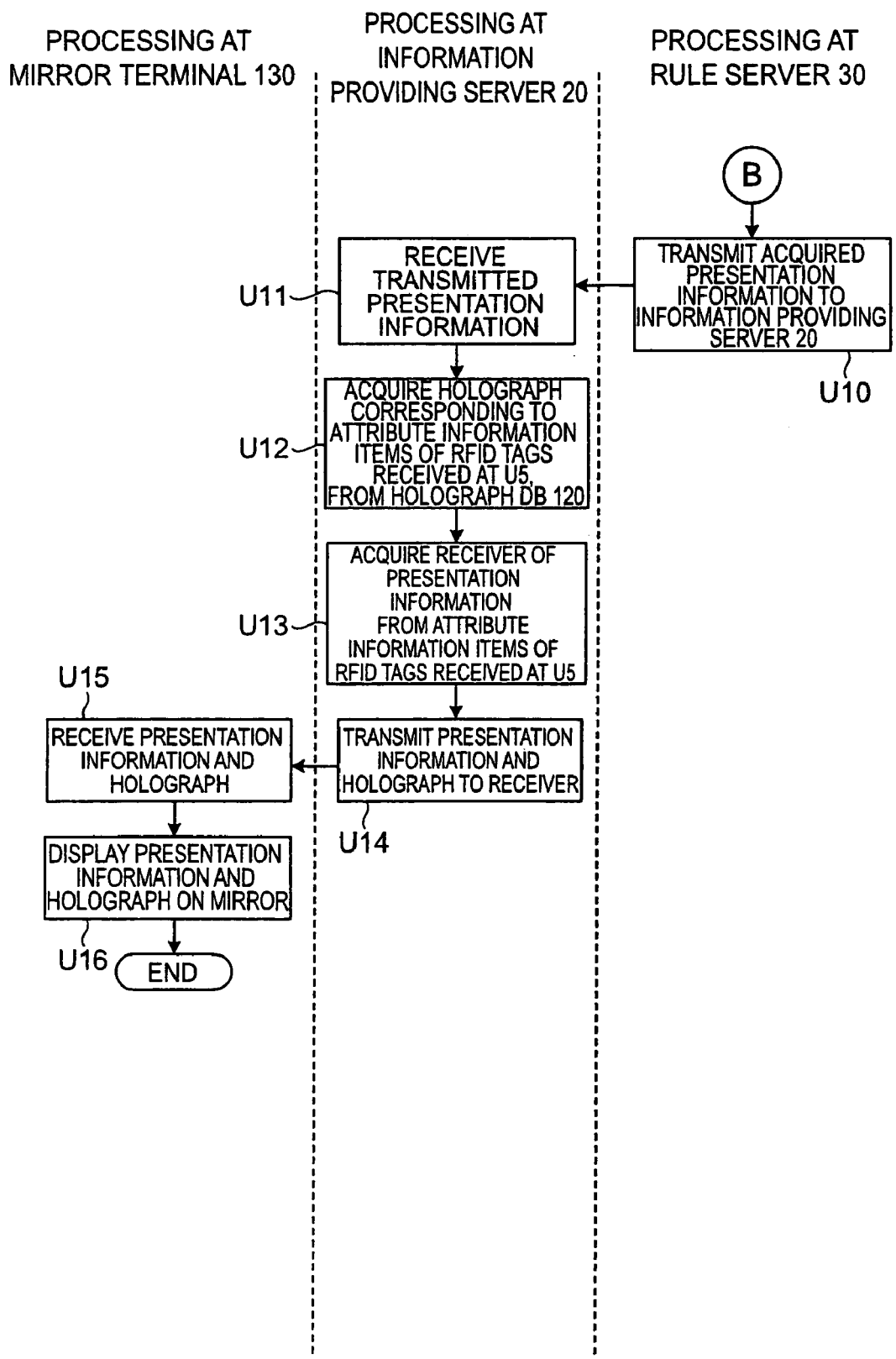
FIG. 15 is a diagram showing the second half of the flowchart for illustrating the fashion check process.

A fashion check process as an operation in the third embodiment will be described below with reference to FIG. 14. In addition, each of steps forming an information providing method according to the present invention will be described. The present fashion check process includes a plurality of steps similar to those in the dish presentation process (cf. FIG. 4) detailed in the first embodiment. Therefore, the description of the common steps is omitted herein, and processes peculiar to the present invention will be described below. Specifically, U1 and U2 in FIG. 14 are equivalent to S1 and S2 in FIG. 4. In addition, U4–U9 in FIG. 14 and U10 and U11 in FIG. 15 are equivalent to S3–S10 in FIG. 4, and U13 and U14 in FIG. 15 to S11 and S12 in FIG. 4.

At U3, the tag management server 10 acquires attribute information corresponding to the ID of the RFID tag reader 40 acquired at U1, from the reader DB 110. Subsequently, the tag management server 10 transmits the attribute information items of the RFID tags 101 to 105 acquired at U2, and the attribute information of the RFID tag reader 40 acquired at U3, to the information providing server 20 (U4). Five types of attribute information items transmitted at this time are the attribute information items shown in FIG. 11.

At U5, the information providing server 20 receives the attribute information items transmitted at U4, by the attribute information acquirer 21.

When the attribute information transmitter 22 receives the attribute information items, the attribute information transmitter 22 determines a rule server as a receiver of the attribute information items (S5). The rule server can be determined by applying the first and second techniques described in the first embodiment, and the combination of these. The first technique is the technique of using a rate of classes of articles, and the second technique the technique of using the location of the RFID tag reader. In addition to these, it is also possible to adopt a technique of using the attribute information of the RFID tag reader 40 received at U5. The present embodiment employs this technique.

Namely, since the attribute information received at U5 contains the information of "fitting room," the information providing server 20 determines that the user is in a fitting room and desires to utilize the fashion check service, and establishes a connection to the rule server 30 capable of providing the service (U6). Then the information providing server 20 transmits the attribute information items of RFID tags 101 to 105 received at U5, to the rule server 30 (U7).

When the rule server 30 receives all the attribute information items transmitted at U7 (U8), it refers to the rule DB 31 shown in FIG. 13, to acquire the presentation information corresponding to the received attribute information items. At the same time, it acquires a presentation method (U9). In the present embodiment, "green shirt, 20's, female, orange scarf, white turban" is registered as a combination of attribute information items in the rule DB 31, and the attribute information items received at U8 match the combination of these. Therefore, the rule server 30 transmits the presentation information of "They suit you" corresponding to the combination along with the information of "holograph" indicating the presentation method, to the information providing server 20 (U10 in FIG. 15).

If the attribute information items received at U8 do not match the above combination, the rule server 30 may transmit presentation information of "They do not suit you," or may terminate the fashion check process, without transmission of any information.

When the information providing server 20 receives each information of the presentation information and the presentation method by the presentation information acquirer 23 (U11), it acknowledges that "holograph" is to be used as a presentation method. In the determination of the presentation method, the information providing server may adopt the method directly indicated by the rule server 30 in this manner, but the information providing server 20 itself may select a presentation method according to the combination of received attribute information items.

At U12, in order to acquire a holograph to be presented to the user in addition to the presentation information, the information providing server 20 makes the presentation information acquirer 23 acquire the holograph corresponding to the attribute information items of the RFID tags received at U5, from the holograph DB 120 (U12). Furthermore, the information providing server 20 again refers to the attribute information items received at U5, in order to specify a destination of the presentation information and the holograph. As shown in FIG. 11, the RFID tag 105 attached to mirror terminal 130 connected to the network is registered in the RFID tag DB 60 and the attribute information thereof contains an IP (Internet Protocol) address. Therefore, the presentation information acquirer 23 specifies and acquires this IP address as the destination (U13).

The information providing server 20 makes the presentation information transmitter 24 transmit the presentation information received at U11, with the holograph acquired at U12 (U14). The destination is the mirror terminal 130 which is the destination acquired at U13. When the mirror terminal 130 receives the presentation information and the holograph (U15), it displays an image of the user wearing the clothes (shirt, scarf, and turban) included in the attribute information items, with the message of "They suit you" on a mirror surface part (U16).

In the information providing system 3 in the third embodiment, as described above, when the user brings clothes of interest in purchasing, into the fitting room, the attribute information items of the user and clothes, and of the mirror set in the fitting room are transmitted through the tag management server 10 to the information providing server 20. The information providing server 20 transmits these attribute information items to the rule server 30 to acquire the information and method to be presented to the user. When the presentation method is a holograph, the information providing server 20 accesses the holograph DB 120 to acquire the holograph generated based on the attribute information items. The presentation information and holograph acquired are presented through the mirror terminal 130 to the user. The user looks at the image displayed on the mirror surface, whereby the user can readily judge whether the user looks good in the clothes, without actually trying the clothes on.

It is noted that the present invention is by no means intended to be limited to each of the above embodiments and that the invention can also adopt modified forms as needed, within the scope not departing from the spirit thereof.

For example, each of the server apparatus such as the tag management server 10, the rule server 30, and so on forming the information providing systems in the first to third embodiments was constructed as a separate apparatus from the information providing server 20, but these server apparatus may also be integrated therewith. Conversely, the major functions of the information providing server 20 (the acquiring and transmitting functions of attribute information, and the acquiring and transmitting functions of presentation information) can also be implemented in a scattered state in server devices physically constructed as separate devices. This enhances the location transparency in the present system.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A server apparatus, comprising:
   attribute information acquiring means for acquiring attribute information items corresponding to each of a plurality of RFID tags associated with a user detected by at least one RFID tag reader;
   presentation information acquiring means for acquiring presentation information determined according to a combination of the plural attribute information items acquired by the attribute information acquiring means; and
   transmitting means for transmitting, to the user, the presentation information acquired by the presentation information acquiring means.

2. The server apparatus according to claim 1, wherein the plurality of RFID tags are RFID tags detected by a plurality of different RFID tag readers.

3. The server apparatus according to claim 1, wherein the acquired presentation information is information of an object substantialized by a combination of objects related to the attribute information items.

4. An information providing method comprising the following steps executed by a server apparatus:
   an attribute information acquiring step of acquiring attribute information items corresponding to each of a plurality of RFID tags associated with a user detected by at least one RFID tag reader;
   a presentation information acquiring step of acquiring presentation information determined according to a combination of the plural attribute information items acquired in the attribute information acquiring step; and
   a transmission step of transmitting, to the user, the presentation information acquired in the presentation information acquiring step.

5. The method of claim 4, wherein the attribute information items correspond to a plurality of objects selected for purchase by the user.

6. The method of claim 5, wherein the presentation information acquiring step comprises determining presentation information based on the plurality of objects selected for purchase by the user.

* * * * *